United States Patent

Dierksmeier et al.

Patent Number: 5,836,742
Date of Patent: Nov. 17, 1998

[54] HIGH TEMPERATURE ROTOR BLADE ATTACHMENT

[75] Inventors: Douglas D. Dierksmeier, Columbus; Tab M. Heffernan, Indianapolis, both of Ind.

[73] Assignee: Allison Engine Company, Inc., Indianapolis, Ind.

[21] Appl. No.: 784,350

[22] Filed: Jan. 16, 1997

Related U.S. Application Data

[62] Division of Ser. No. 509,777, Aug. 1, 1995, Pat. No. 5,688,108.

[51] Int. Cl.$^6$ .................................................. F04D 29/58
[52] U.S. Cl. ........................................... 416/95; 416/96 R
[58] Field of Search ................................ 416/95 R, 96 R, 416/213 R, 219 R; 415/115, 116, 200; 29/889.1, 889.2, 889.21, 889.22

[56] References Cited

U.S. PATENT DOCUMENTS

| | | |
|---|---|---|
| 3,749,514 | 7/1973 | Kelch et al. . |
| 3,952,391 | 4/1976 | Gee . |
| 4,093,399 | 6/1978 | Glenn . |
| 4,094,615 | 6/1978 | Glenn . |
| 4,097,276 | 6/1978 | Six . |
| 4,270,257 | 6/1981 | Ewing . |
| 4,417,854 | 11/1983 | Cain et al. . |
| 4,494,287 | 1/1985 | Cruzen et al. . |
| 4,529,452 | 7/1985 | Walker . |
| 4,688,992 | 8/1987 | Kirkpatrick et al. . |
| 4,767,274 | 8/1988 | Walter . |
| 4,784,573 | 11/1988 | Ress, Jr. . |
| 4,796,343 | 1/1989 | Wing . |
| 4,813,848 | 3/1989 | Novotny . |
| 4,883,216 | 11/1989 | Patsfall . |
| 4,907,947 | 3/1990 | Hoppin, III . |
| 4,940,390 | 7/1990 | Clark et al. . |
| 5,024,582 | 6/1991 | Bellows et al. . |
| 5,030,063 | 7/1991 | Berger . |
| 5,106,012 | 4/1992 | Hyzak et al. . |
| 5,106,266 | 4/1992 | Borns . |
| 5,113,583 | 5/1992 | Jenkel et al. . |
| 5,197,190 | 3/1993 | Coolidge . |
| 5,240,375 | 8/1993 | Wayte . |
| 5,281,097 | 1/1994 | Wilson et al. ............................ 416/95 |
| 5,339,619 | 8/1994 | Antonellis ............................... 416/95 |
| 5,492,447 | 2/1996 | Mannava et al. . |
| 5,511,949 | 4/1996 | Thore . |
| 5,540,790 | 7/1996 | Erickson . |
| 5,630,703 | 5/1997 | Hendley et al. ......................... 416/95 |

*Primary Examiner*—John T. Kwon
*Attorney, Agent, or Firm*—Woodward, Emhardt, Naughton Moriarty & McNett

[57] ABSTRACT

A lightweight high temperature rotor blade attachment structure for use in a gas turbine engine. The lightweight high temperature rotor blade attachment lug being cast of a single crystal alloy and the lug is then bonded to a conventional nickel based wheel. A circular arc firtree is utilized to connect the insertable turbine blade between a pair of circumferentially spaced lugs that have been bonded to the turbine disk. In an alternate form of the present invention the attachment lug includes an internal cooling passage for receiving cooling fluid from a compressor. More particularly, the present invention discloses a single crystal attachment lug that is bonded to a powdered metal nickel alloy rotor disk and includes internal cooling passages, and in one form is designed for use with turbine blades that do not have a platform. Further, in another form of the present invention the single crystal attachment lug is bonded to the powdered metal nickel rotor disk and is designed to be used with turbine blades having a platform.

18 Claims, 8 Drawing Sheets

HIGH TEMPERATURE ROTOR BLADE ATTACHMENT

This application is a division of application Ser. No. 08/509,777, filed Aug. 1, 1995, now U.S. Pat. No. 5,688,108.

BACKGROUND OF THE INVENTION

The present invention relates generally to the design and construction of a lightweight high temperature turbine blade attachment structure for use in a gas turbine engine. More particularly, the present invention has one form wherein a high strength blade attachment lug, which is cast of a single crystal alloy material, is bonded to a conventional powder metal nickel alloy wheel. The high performance blade attachment lug of the present invention has higher strength properties at elevated temperatures relative to conventional nickel alloy rims with no effective increase in weight. Although the invention was developed for use in gas turbine engines, certain applications may be outside of this field.

A gas turbine engine is typical of the type of turbomachinery in which the invention described herein may be advantageously employed. It is well known that modern designers of gas turbine engines have generally utilized an axial flow compressor for compressing air to the proper pressure required for supporting the combustion of fuel in a combustion chamber. The high temperature exhaust gas exiting the combustion chamber provides the working fluid for the turbine, which powers the axial flow compressor. A power turbine that is driven by the flow of high temperature gas is utilized to turn a propeller, fan or other device. Further, the high temperature gas may be used directly as a thrust for providing motive power, such as in a turbine jet engine.

It is well known that the performance of gas turbine engines increase with the increase in the operating temperature of the flow of high temperature gas from the combustion chamber. A factor limiting the allowable temperature of the gaseous working flow from the combustion chamber is the capability of the various engine components to not degrade when exposed to the high temperature gas flow. Further, maintainability of the gas turbine engine necessitates that the various components that are subjected to the high temperature gas flow must be readily serviceable in order to minimize the down time of the gas turbine engine and the cost associated with repairs thereto. Various techniques have been utilized by engine designers to increase the allowable temperature of the gaseous working fluid, and to enhance the serviceability of engine components.

Gas turbine engine designers have generally sought to increase specific thrust, and reduce the specific fuel consumption in a gas turbine engine. However, associated with these parameters has generally been an increase in turbine inlet temperature and compressor discharge temperature. While the elevated fluid temperatures have increased the performance of the gas turbine engines it has resulted in higher blade platform, stalk, and attachment temperatures which have been generally lowered by using additional compressor discharge cooling air. Further, the prior designers of gas turbine engines have sought to reduce the attachment temperature by increasing the stalk length of the blade to isolate the wheel rim from the hot gaseous fluid flow path.

Cooling of the various components of the gas turbine engine is preferably accomplished with a minimum amount of cooling fluid, since the cooling fluid is working fluid which has been extracted from the compressor and its loss from the gas flow rapidly reduces engine efficiency. Therefore, the use of additional cooling fluid to cool the engine components increases the specific fuel consumption. Further, the design efforts to increase the temperature of the compressor discharge fluid, which is used to cool the blade platform, stalk and attachment compounds the cooling and specific fuel consumption issues.

With reference to FIG. 1, there is illustrated a conventional gas turbine blade 'a' that is carried by a turbine wheel (not illustrated). Gas turbine blade 'a' has as principle regions an airfoil 'b', an attachment portion 'c' and a stalk 'd' which extends between the attachment portion 'c' and the airfoil 'a'. A blade platform 'e' is disposed above the stalk 'd' and is designed to shield the turbine wheel from the flow of high temperature gas from the combustion chamber. In many designs the stalk 'd' function to elevate the platform 'e' from the wheel in order to minimize heat transfer to the wheel, and the corresponding degradation thereof. One limitation generally associated with the prior design is that the platform 'e' and the stalk 'd' increase the weight, centrifugal pull and attachment stress on the rotor system.

Heretofore, there has been a need for a lightweight high temperature turbine rotor blade attachment structure for use in a gas turbine engine. A means for satisfying this need has theretofore escaped those skilled in the art.

SUMMARY OF THE INVENTION

One form of the present invention contemplates a rotor system for use in a gas turbine engine. The rotor system comprising: a disk; at least one blade; and a plurality of single crystal blade attachment lugs bonded to the disk, at least two of the plurality of blade attachment lugs cooperating for connecting the at least one blade to the disk.

Another form of the present invention contemplates a combination, comprising: a gas turbine engine; and a rotor comprising a disk, and a blade attachment lug connected to the disk, the blade attachment lug having at least one cooling fluid passageway therein.

One object of the present invention is to provide an improved rotor for a gas turbine engine.

Related objects and advantages of the present invention will be apparent from the following description.

BRIEF DESCRIPTION OF THE DRAWINGS

FIG. 6 is an illustrative top plan view of the rotor of FIG. 5a.

DESCRIPTION OF THE PREFERRED EMBODIMENT

Figure 1:
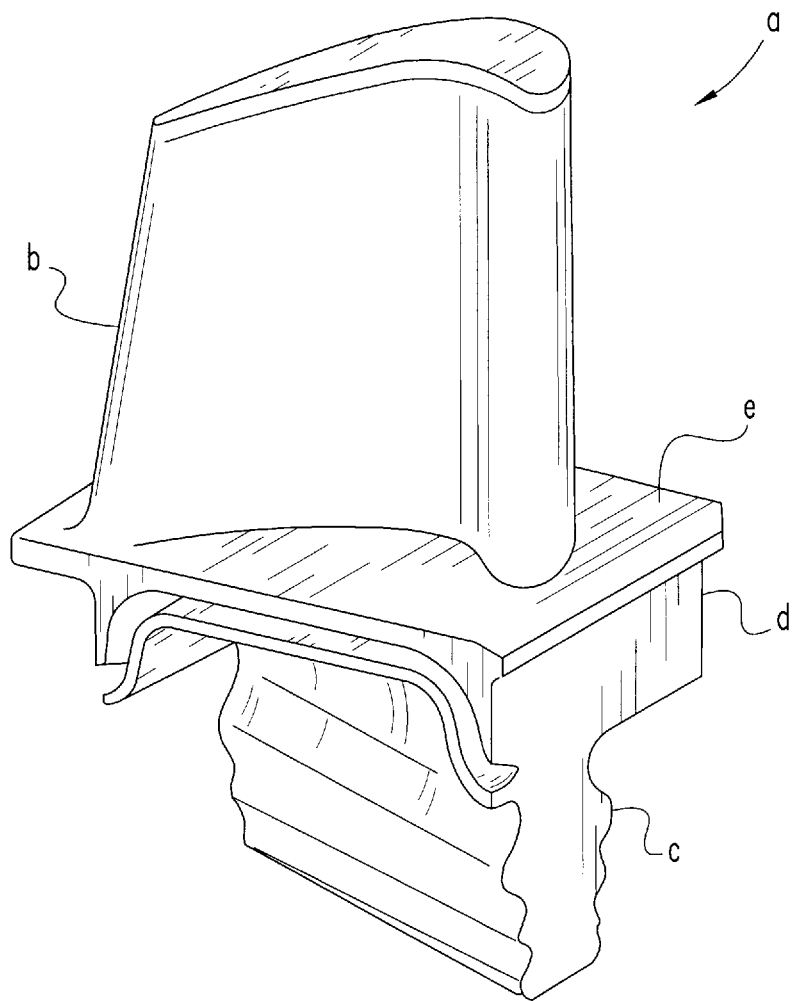
FIG. 1 is a perspective view of a prior art turbine blade.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
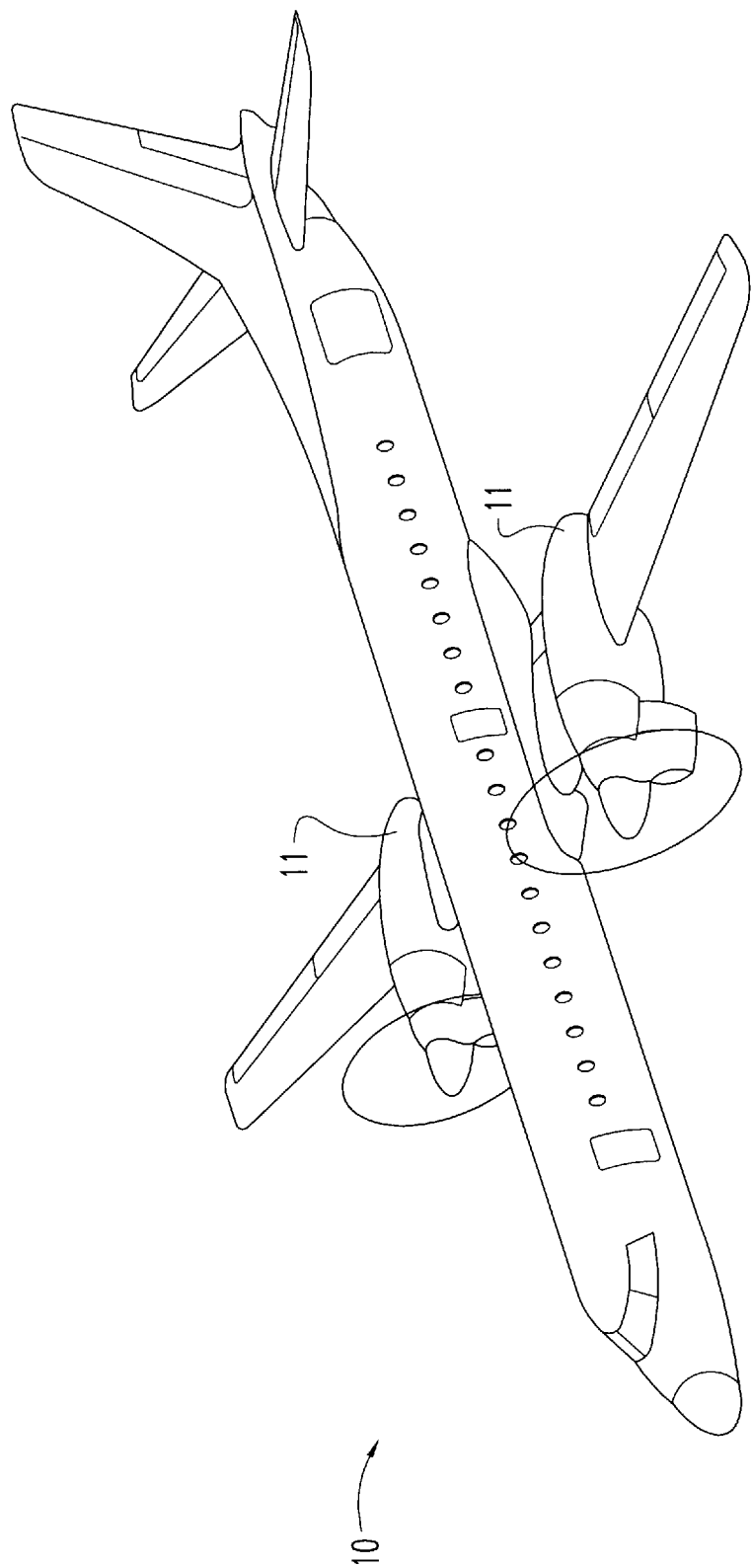
FIG. 2 is a perspective view of an aircraft having a gas turbine engine connected thereto.
Figure 3:
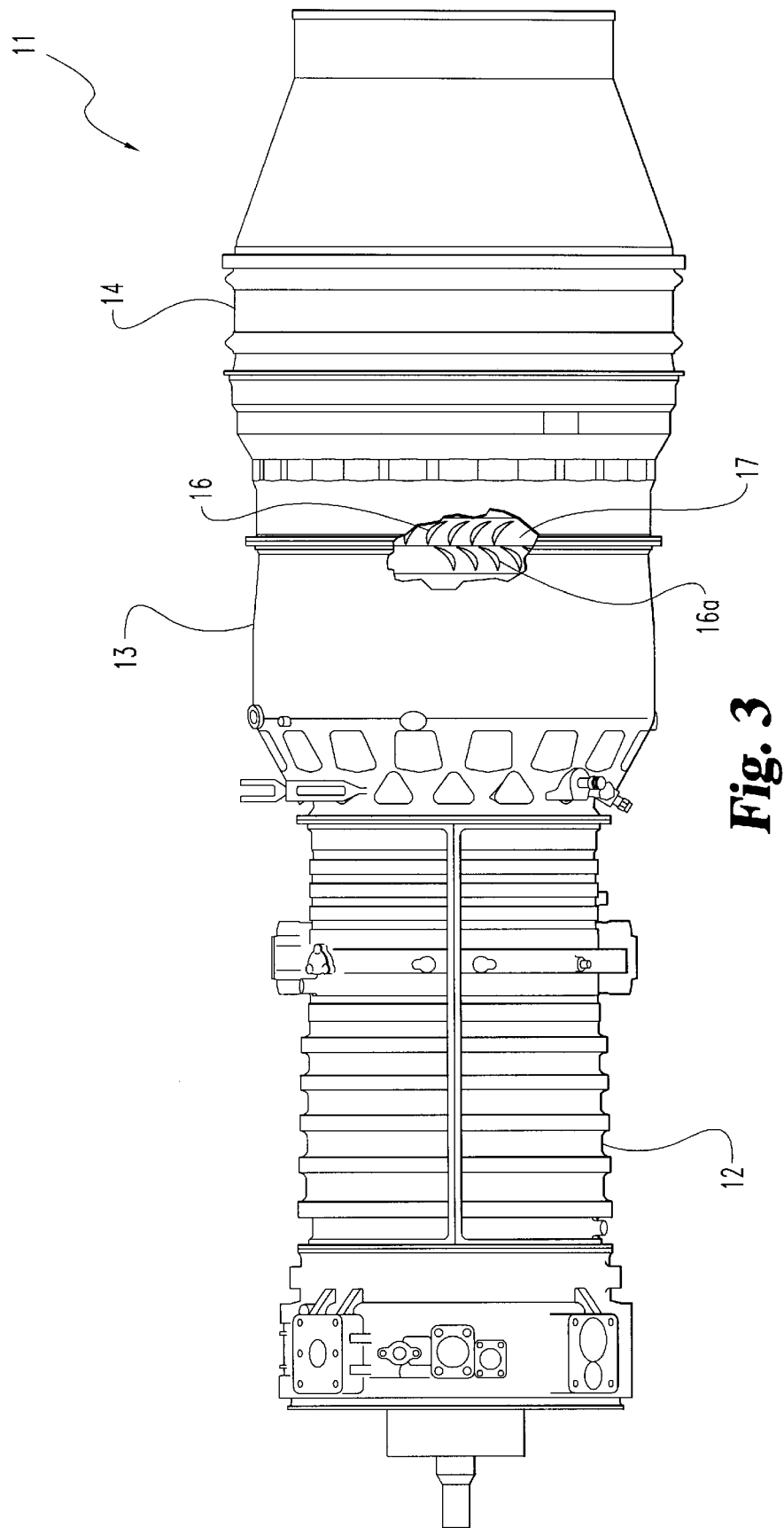
FIG. 3 is an enlarged partially fragmented side elevational view of the gas turbine engine of FIG. 2.

Referring to FIGS. 2 & 3, there is illustrated an aircraft 10 having an aircraft flight propulsion engine 11. It is understood that an aircraft is generic and includes helicopters, tactical fighters, trainers, missiles and other related apparatuses. In the preferred embodiment the flight propulsion engine 11 includes a compressor 12, a combustor 13 and a power turbine 14. It is important to realize that there are a multitude of ways in which the components can be linked together. Additional compressors and turbines could be added with inner coolers connecting between the compressors and reheat combustor chambers could be added between the turbines. Further, the gas turbine engine is equally suited to be used for industrial application. Historically there has been wide spread application of industrial gas turbine engines, such as pumping sets for gas and oil transmission lines, electricity generation and navel propulsion.

With reference to FIG. 3, there is illustrated an enlarged partially fragmented view of gas turbine engine 11 having a rotor system therein. A plurality of turbine blades 16 are insertably mounted to a disk 17 that is affixed to a tubular shaft within the gas turbine engine 11. A plurality of turbine vanes 16a forms a portion of the nozzle within the gas turbine engine. In the preferred embodiment the gas turbine blades 16 and vanes 16a are unitary cast alloy structures produced by a precision casting operation utilizing various super alloy compositions. Various types of super alloy compositions and manufactures of such compositions are known to those skilled in the art. Most super alloy compositions of interest are complicated mixtures of nickel, chromium, aluminum and other select elements. One technique for producing a cast unitary turbine blade 16 or vane 16a having equiaxed, directionally solidified, and single crystal alloy structures is disclosed in U.S. Pat. No. 5,295,530 to O'Connor which is incorporated by reference herein. In the preferred embodiment the gas turbine blade 16 and vanes 16a are of a single crystal alloy structure. It is understood that a gas turbine blade and a gas turbine vane are often referred to as an airfoil.

As used herein, a single crystal article is one in which substantially all of the article has a single crystallographic orientation through the load bearing portions, without the presence of high angle grain boundaries. A small amount of low angle grain boundaries such as tilt, or twist boundaries are permitted within such a single crystal article but are preferably not present. However, such low angle boundaries are often present after solidification and formation of the single crystal article, or after some deformation of the article during creep or other light deformation process. Other minor irregularities are also permitted within the scope of the term "single crystal". For example, small areas of high angle grain boundaries may be formed in various portions of the article, due to the inability of the single crystal to grow perfectly near corners and the like. Such deviations from a perfect single crystal, which are found in normal commercial production operations are within the scope of the term single crystal as used herein.

Figure 4:
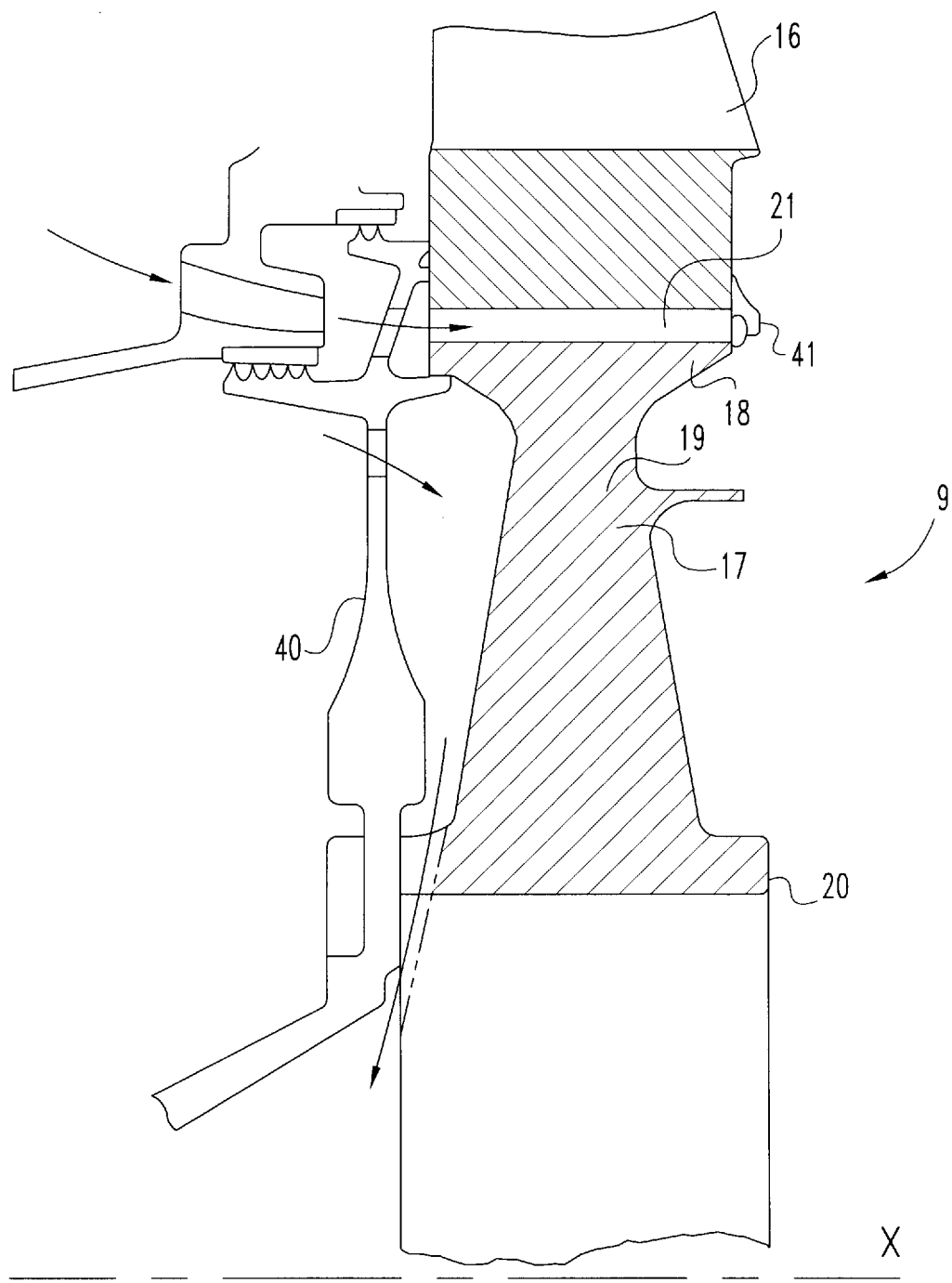
FIG. 4 is an illustrative partial side elevation sectional view of a rotor with a high temperature turbine blade attachment lug according to one form of the present invention.

With reference to FIG. 4, there is illustrated a sectional view of a rotor system 9. It is understood that the rotor disk 17 is symmetrical about an axial centerline 'x' of the gas turbine engine 11. In the preferred embodiment the rotor disk 17 has a plurality of circumferentially spaced turbine blades 16 attached thereto. The rotor disk 17 includes a thickened rim section 18, a relatively thin web section 19 and a thickened bore section 20. The plurality of turbine blades 16 extend radially outward from the rim portion 18 and are carried by the disk 17. A cover plate 40 and a rear retainer 41 are utilized to minimize or prevent the axial movement of blade 16 relative to the disk 17.

In the preferred embodiment the rotor system 9 is designed and manufactured for installation into a turbine 14 of a flight propulsion engine 11. While the present invention has been described for use in a turbine, it is realized by those skilled in the art that it has applications in a compressor. In the preferred embodiment the disk 17 is formed of a powder metal nickel super alloy. In the most preferred embodiment the disk 17 is formed of AF2-IDA-6 powder metal material which contains the following elements: about 0.04% carbon, about 12% chromium, about 10% cobalt, about 2.75% molybdenum, about 6.5% tungsten, about 2.8% titanium, about 1.5% tantalum, about 4.6% aluminum, about 0.015% boron, about 0.10% zirconium, and about 59.695% nickel. It is contemplated that the disk 17 can be formed of other materials having similar properties to the materials cited herein.

A flow of cooling fluid from the compressor 12 is discharged through a mechanical structure within the gas turbine engine 11 and directed to cool the rotor system 9. A compressor bleed is utilized to pass cooling fluid along the web section 19 and bore section 20 of the disk 17. A quantity of cooling fluid is directed from the compressor and receivable into a slot 21 formed in the rotor disk 17. The slot is formed in the rotor disk 17 between two of the plurality of blade attachment lugs 22 and allows the passage of cooling fluid beneath the turbine blade 16. In the preferred embodiment the slot 21 is recessed in the disk 17. It is understood that there are a plurality of slots 21 spaced circumferentially around the rotor disk 17, and the slots are in alignment with the turbine blades 16.

Figure 5:
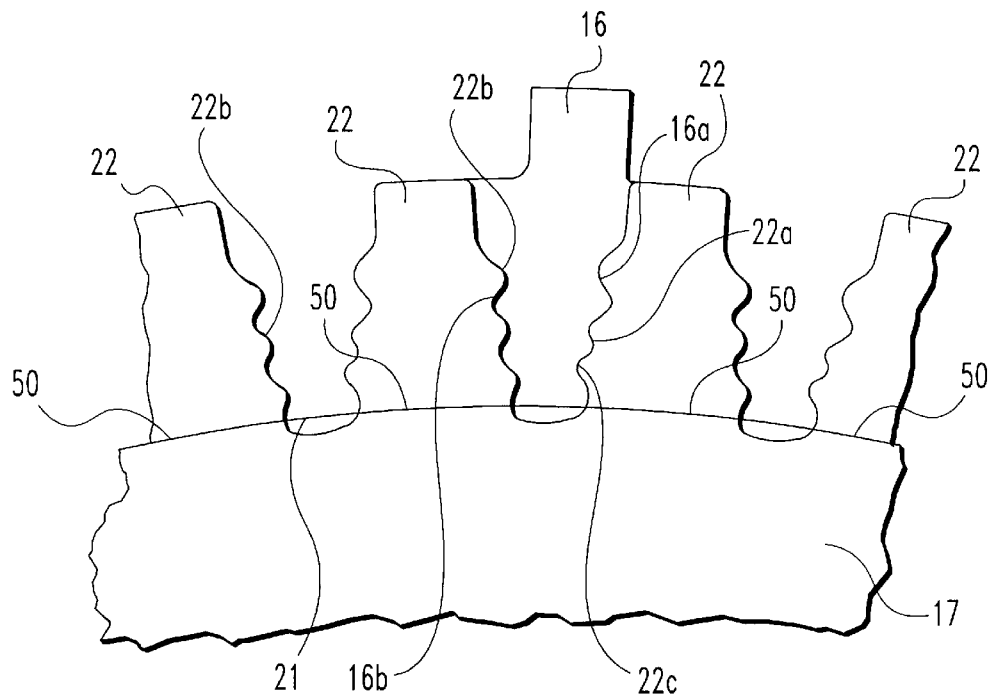
FIG. 5 is a partial end view of the rotor of FIG. 4.

Referring to FIG. 5, there is illustrated an enlarged partial end view of the rotor disk 17 having a plurality of circumferentially spaced blade attachment lugs/rim segments 22 connected thereto. At least two of the plurality of blade attachment lugs 22 cooperating for connecting a turbine blade 16 to the rotor disk 17. In the preferred embodiment the blade attachment lugs 22 are bonded to the surface 50 of disk 17. The bond is accomplished through techniques known to those skilled in the art and include diffusion bond brazing in which a hyper eutectic composition of nickel, chromium and boron (Ni—Cr—B) is used.

In the preferred embodiment each of the plurality of lugs 22 are formed as a cast solid single crystal article. The lugs 22 in the preferred embodiment being formed of a different material than the disk 17. As previously discussed herein U.S. Pat. No. 5,295,530 to O'Connor discloses a method for producing a single crystal article. In the most preferred embodiment the single crystal alloy material has the following composition: about 6.5% chromium, about 9.0% cobalt, about 0.6% molybdenum, about 6.0% tungsten, about 1.0% titanium, about 6.5% tantalum, about 5.6% aluminum, about 61.8% nickel and about 3.0% rhenium. Material of this composition is currently available from Cannon-Muskegan Corporation of Muskagan, Mich. and is sold under the trademark of CMSX-4®. It is understood that the lugs 22 can be formed of other single crystal alloy materials having similar properties to the materials recited herein.

Figure 5A:
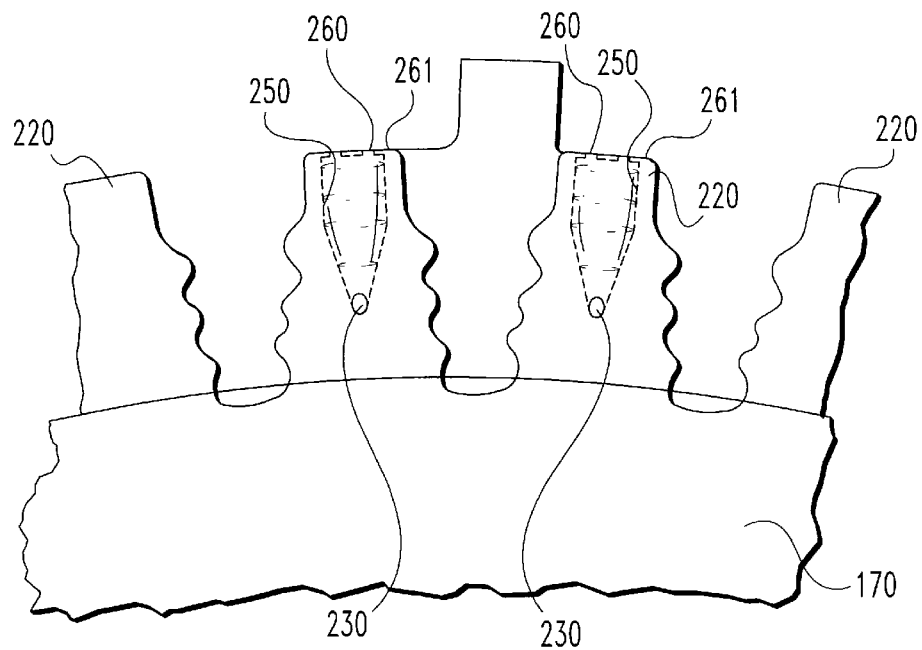
FIG. 5a is a partial end view of an alternate form of the present invention comprising a high temperature turbine blade attachment lug having an internal cooling passageway therein.
Figure 7:
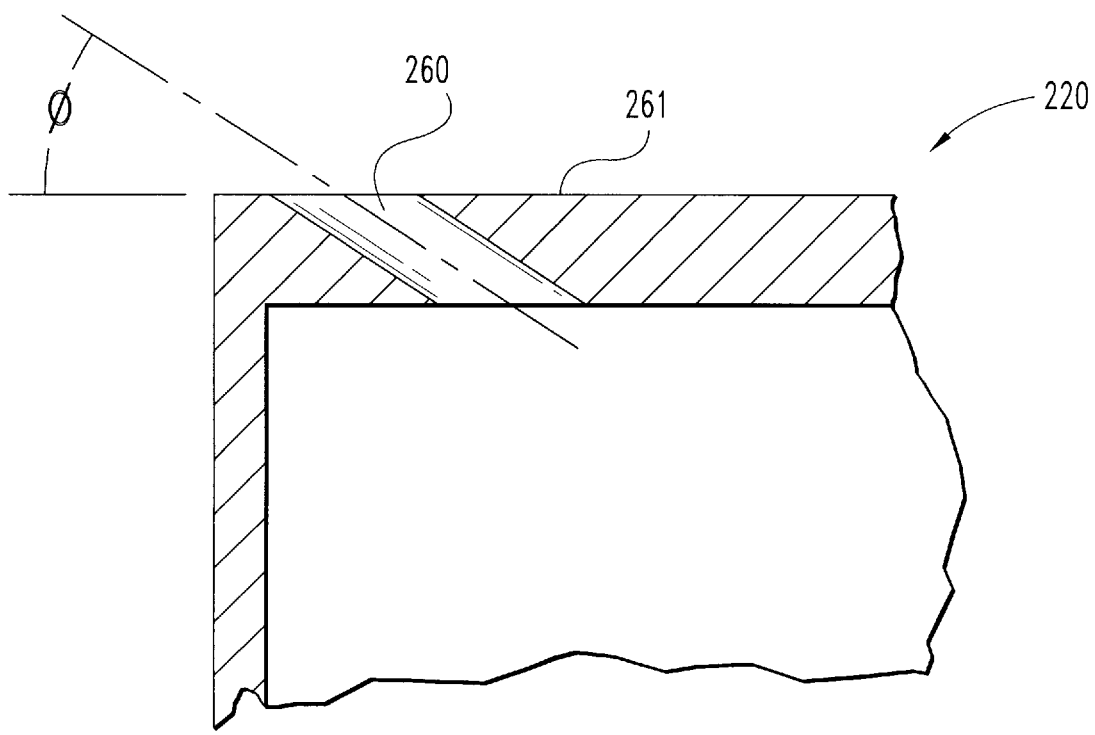
FIG. 7 is an enlarged partial sectional view taken along line 7—7 of the high temperature attachment lug of FIG. 6.

With reference to FIG. 5a, there is illustrated an alternative form of the high temperature turbine blade attachment lug. High temperature turbine blade attachment lug 220 is substantially similar to attachment lug 22, however it has an internal passageway 250 (illustrated in dashed lines) for the passage of cooling fluid. Most other aspects of the rotor system are identical to rotor system 9, including but not limited to things such as material specifications, number of blades and attachment structure. The cast hollow lug 220 having an oval shaped entry aperture 230 that allows the introduction of cooling fluid from the compressor to the internal passageway 250. The lug 220 and lug 22 being substantially identical in all other respects. The passage of cooling fluid through the lug 220 increases the heat transfer from the disk 170. A plurality of exit apertures 260 for discharging cooling fluid are formed on the radially outer most surface 261 of the blade attachment lugs 220. In the preferred embodiment the plurality of exit apertures 260 are inclined at an acute angle θ to the radially outer most surface 261 of cooling lugs 220 (FIG. 7). In the preferred embodiment angle θ is about 30°. It is understood by those skilled in the art that a plurality of cooling apertures formed along the outer most surface 261 of the lug 220 will facilitate the film cooling of the lug 220.

The blade attachment lugs 22 and blades 16 both include an attachment portion 16a and 22a respectively that interlock to maintain the blade 16 between a pair of attachment lugs 22. The attachment portion 16a of blade 16 being insertable between two of She plurality of lugs 22. An interlocking protuberance 22b and groove 16b are well known in the art for retaining a blade within a rotor disk 17. In one form of the present invention the interengaging blade 16 and pair of attachment lugs 22 include a single protuberance that is nested within a groove located on each side of the attachment lugs 22. Further, it is illustrated in FIG. 5, that a plurality of interlocking grooves and ridges can be formed on either the blade or the lugs 22. It is generally known to those skilled in the art that this interlocking arrangement is a firtree. The present invention contemplates other methods of attaching the blade to the pair of spaced attachment lugs 22.

In one form of the present invention the plurality of lugs 22 are bonded to the disk 17 above slot 21. In another form of the present invention the plurality of lugs 22 are bonded to the disk 17 below the attachment portion 22a of the lug 22. More particularly the lug 22 is bonded to the disk 17 below the last interlocking protuberance 22c of the lug. In the preferred embodiment the lug 22 is bonded to disk 17 in a range above the slot 21 and below the last interlocking protuberance 22c of the lug 22.

Figure 6:
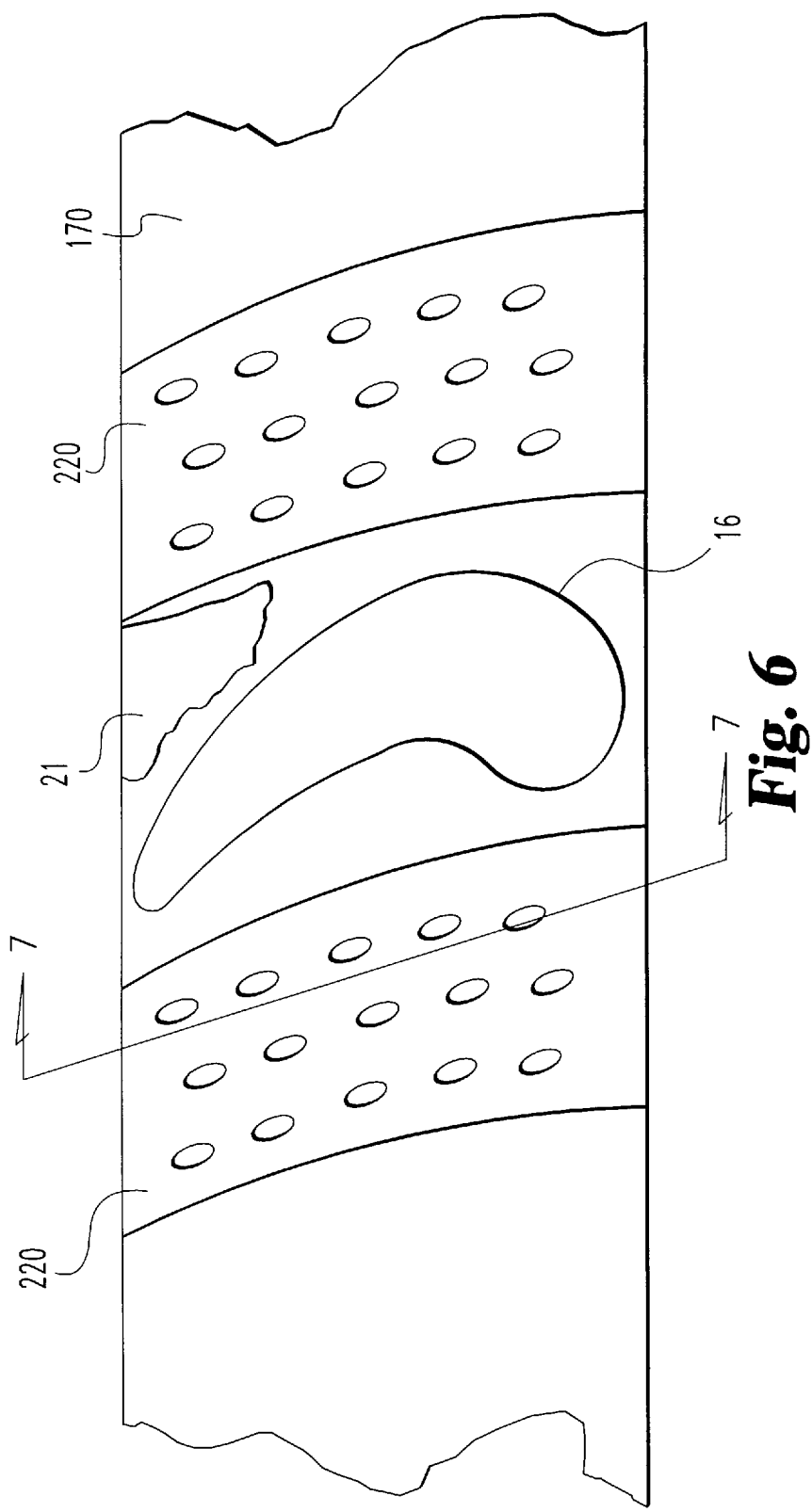

With reference to FIG. 6, there is illustrated an illustrative top plan view of a portion of the outer perimeter of the disk 170. It is understood that this top plan view is equally applicable to rotor 9, that does not have cooling apertures. Blade 16 is mounted above the slot 21 which is positioned between a pair of blade attachment lugs 220. In a preferred form of the present invention the slot 21 is formed as a circular arc. A circular arc firtree is the terminology utilized by those skilled in the art to describe the interengagement of the attachment portions of the plurality of lugs and blades that are formed on an arc. A circular arc firtree is utilized to efficiently transfer the blade load to the firtree attachment.

Figure 8:
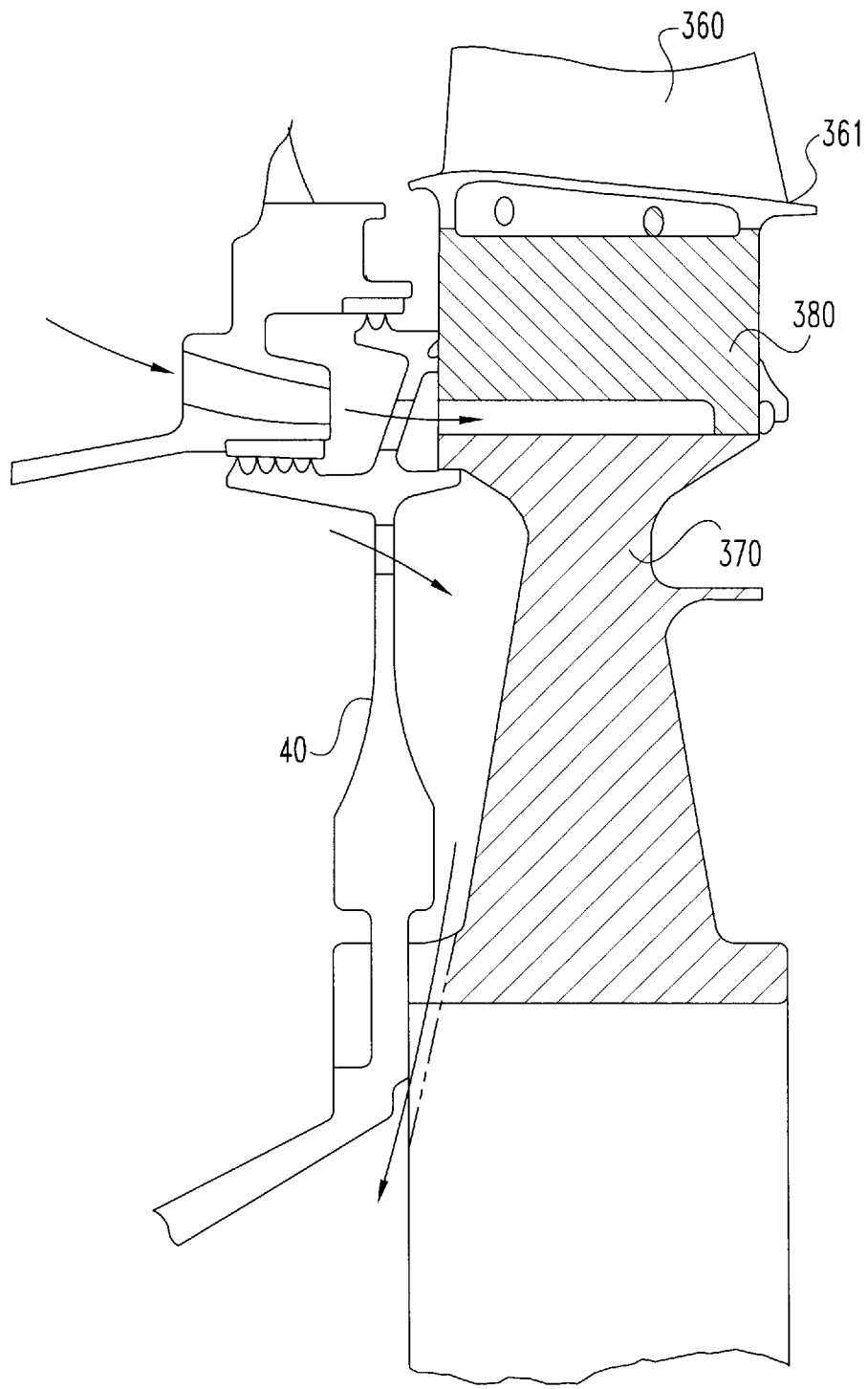
FIG. 8 is an illustrative partial side elevational sectional view of an alternative form of the rotor comprising a high temperature turbine blade attachment lug and a turbine blade having a platform connected thereto.

With referent to FIG. 8, there is illustrated an alternate form of the present invention. A turbine rotor disk 370 that is substantially similar to turbine rotor disk 17, wherein like parts have been labeled with identical numbers. A distinguishing feature between the rotor disk 370 and the prior rotor disk 17 is that the turbine blade 360 includes a platform 361 that shields a portion of the rim section 380. In the rotor disk 370 of the present invention the platform 361 functions to shield the rim section 380 from the high temperature gaseous flow that drive the turbine. In contrast the rotor disk 17 has been designed and manufactured so that a platform is not not required to shield the rotor disk 17 from this hot gaseous flow, rather the single crystal attachment lugs 22 are designed to withstand the high temperature gaseous flow. By eliminating the platform there is a reduction in weight and centrifugal force, thereby reducing the attachment stresses and making a lighter weight rotor system possible.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:

a gas turbine engine, and a rotor comprising:

a disk; and a blade attachment lug connected to said disk, said blade attachment lug having at least one cooling fluid passageway therein.

2. The combination of claim 1, wherein said lug having an aperture for receiving cooling fluid therein.

3. The combination of claim 2, wherein said lug has at least one exit aperture for discharging cooling fluid.

4. The combination of claim 3, wherein said at least one exit aperture for discharging cooling fluid along a portion of the outer surface of said lug.

5. The combination of claim 4, wherein said lug includes a plurality of exit apertures, each of said exit apertures for discharging cooling fluid along the outer surface of said lug to enhance film cooling.

6. The combination of claim 5, wherein said exit apertures are formed at an acute angle to said outer surface of said lugs.

7. The combination of claim 6, wherein said lug is a single crystal.

8. The combination of claim 7, which further includes a plurality of lugs connected to said disk.

9. The combination of claim 8, wherein said lugs are bonded to said disk.

10. The combination of claim 1, wherein said disk and said blade attachment lug are formed of different materials, and wherein said blade attachment lug is formed of a higher temperature material than said disk.

11. The combination of claim 10, wherein:

said lug is cast;

said lug having at least one entrance aperture for allowing cooling fluid into said cooling fluid passageway and a plurality of exit apertures for allowing the discharge of cooling fluid from said cooling fluid passageway, said entrance aperture being positioned radially inward relative to said exit apertures; and said lug being bonded to said disk.

12. A rotor system, comprising:

a disk;

at least one airfoil; and a plurality of circumferentially spaced high temperature airfoil attachment lugs located along the periphery of said disk, at least two of said plurality of airfoil attachment lugs cooperating for coupling said at least one airfoil to said disk, wherein each of said plurality of airfoil attachment lugs having at least one fluid passageway formed therein.

13. The rotor system of claim 12, wherein each of said lugs having an entrance aperture for allowing the passage of cooling fluid into said fluid passageway and an exit aperture for allowing the discharge of cooling fluid from said passageway.

14. The rotor system of claim 13, wherein each of said plurality of lugs are of a cast structure.

15. The rotor system of claim 12, wherein each of said plurality of lugs is a single crystal.

16. The rotor system of claim 13, wherein said disk and said plurality of lugs are formed of different materials, and wherein each of said lugs includes a plurality of exit apertures on a radially outward surface for allowing the discharge of cooling fluid so as to enhance film cooling.

17. In combination:

a gas turbine engine; and a rotor rotatable within said gas turbine engine, comprising:

a plurality of high temperature airfoils;

a disk for carrying said plurality of airfoils;

a plurality of circumferentially spaced high temperature airfoil attachment lugs connected along the periphery of said disk, at least two of said plurality of airfoil attachment lugs cooperating for receiving one of said plurality of airfoils therebetween, each of said plurality of airfoil attachment lugs having a fluid passageway formed therein, said fluid passageway having an entrance aperture and a plurality of exit apertures spaced therefrom, said exit apertures allowing the discharge of cooling fluid along the outer surface of said lug to facilitate film cooling.

18. The combination of claim 17, wherein said disk and said plurality of attachment lugs are formed of a different material, and said plurality of lugs being of a cast configuration.

* * * * *

UNITED STATES PATENT AND TRADEMARK OFFICE
CERTIFICATE OF CORRECTION

PATENT NO. : 5,836,742
DATED : November 17, 1998
INVENTOR(S) : Douglas D. Dierksmeier et al.

It is certified that error appears in the above-identified patent and that said Letters Patent is hereby corrected as shown below:

In col. 5, line 6, please change "Muskagan" to --Muskegan--.

Signed and Sealed this

Twenty-second Day of June, 1999

Attest:

Q. TODD DICKINSON

*Attesting Officer*  *Acting Commissioner of Patents and Trademarks*